R. V. JONES.
VELOCIPEDE.
APPLICATION FILED DEC. 17, 1907.

922,484.

Patented May 25, 1909.

Robert V. Jones,
Inventor

Witnesses
Jas. K. McCathran
S. George Tate

By
C. G. Siggers
Attorney

THE NORRIS PETERS CO., WASHINGTON, D. C.

UNITED STATES PATENT OFFICE.

ROBERT V. JONES, OF CANTON, OHIO, ASSIGNOR OF ONE-HALF TO SAMUEL ZECHER, OF CANTON, OHIO.

VELOCIPEDE.

No. 922,484.  Specification of Letters Patent.  Patented May 25, 1909.

Application filed December 17, 1907. Serial No. 406,902.

*To all whom it may concern:*

Be it known that I, ROBERT V. JONES, a citizen of the United States, residing at Canton, in the county of Stark and State of Ohio, have invented a new and useful Velocipede, of which the following is a specification.

This invention relates to that class of velocipedes in which the figure of a horse, or other animal is employed to constitute the body or frame-work of the vehicle, and has for its object to provide a velocipede of this character, which will be simple in construction, cheap to manufacture, easy of operation, and attractive to the eye.

Figure 1:
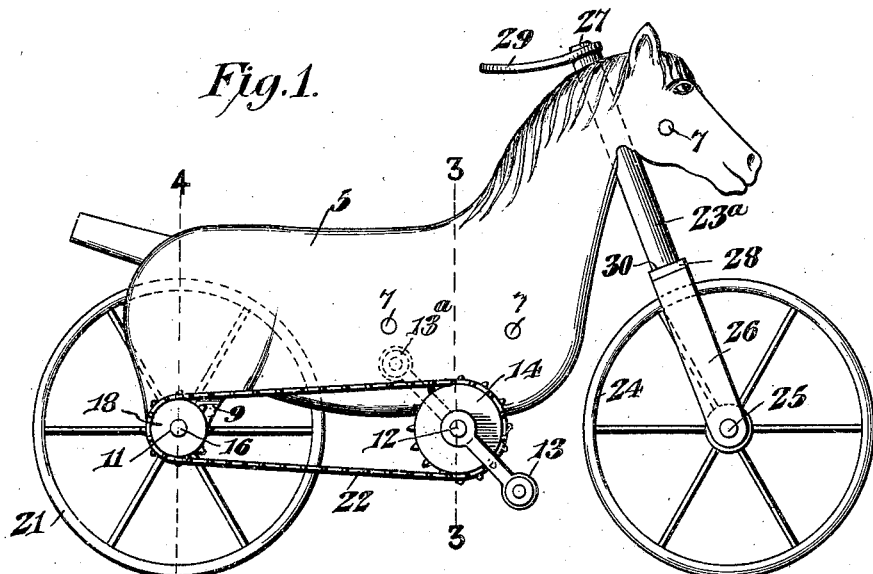
Figure 3:
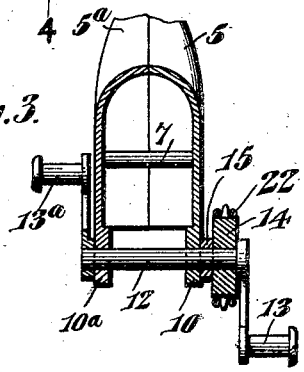
Figure 2:
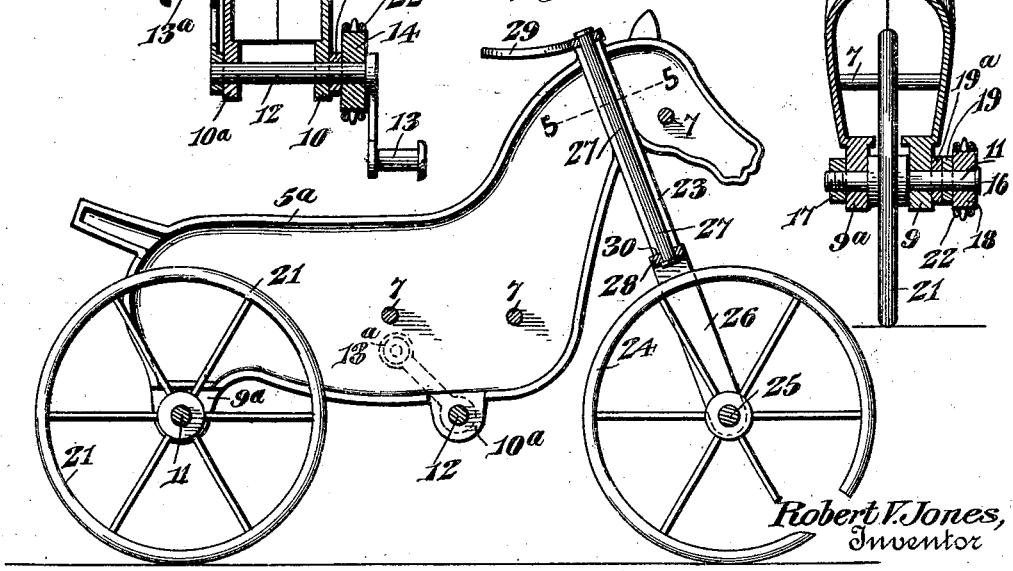
Figure 4:
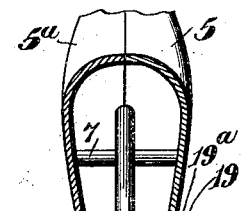
Figure 5:
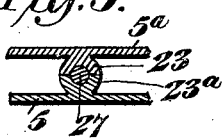

In the drawing:—Figure 1 is a side elevation of the invention with all the parts assembled. Fig. 2 is a longitudinal sectional view of the invention, or in other words, a view showing the near side of the horse removed. Fig. 3 is a vertical sectional view of the invention, taken on the line 3—3 of Fig. 1. Fig. 4 is a vertical sectional view of the invention, taken on the line 4—4 of Fig. 1, and Fig. 5 is a horizontal sectional view of the steering rod and support, taken on the line 5—5 of Fig. 2.

By referring to the drawing, it will be observed that a hollow sectional horse is provided, the two longitudinal sections being designated by the reference numerals 5 and 5ª, and are securely held together by the rivets 7—7—7. Both the hind legs 9—9ª are cut off a little below the body of the horse, and are made thicker than the body to form a strong support for the rear axle 11, which is the driven axle, and pierces the short rear legs, as clearly shown in Fig. 4 of the drawing. The driving shaft or axle 12, which pierces openings formed in depending lugs 10—10ª, is provided at its extreme ends with pedals 13 and 13ª of ordinary construction. Fastened to the driving axle 12, and mounted between the pedal 13 and the lug 10, is a sprocket wheel 14 of the usual construction, which is spaced from the sectional body portion by the washer 15. The rear axle 11 is preferably in the form of a bolt having a head 16 and a fastening nut 17, and is provided at its rear end with a sprocket wheel 18, which is fastened thereto, and spaced from the sectional body portion by a plurality of washers 19 and 19ª. The two sectional body portions 5 and 5ª are spaced apart to provide room for the free rotation of the rear wheel 21, which is also fastened to the rear axle 11. The driving sprocket wheel 14 imparts motion to the rear wheel 21 through the driven sprocket wheel 18 and the sprocket chain 22.

Each section of the horse is made in a single casting or forging of sheet steel and is provided with an integral half section 23 and 23ª of a tube, which is arranged in the neck of the horse and is slightly inclined rearwardly. A front steering wheel 24 is provided, and on the axle 25 thereof is mounted a fork 26, having a shaft 27 centrally and fixedly mounted on the horizontal bar 28 of the fork either by riveting or other suitable means. This shaft, which passes through and slightly beyond the upper end of the tube, is provided with handle bars 29 that are rigidly mounted on the upper end of the shaft 27. The lower end of the sectional tube rides on the horizontal bar 28 of the fork 26 and thereby forms a bearing 30 for the steering device.

From the foregoing description, it will be observed that by this construction, the body of the horse is arranged as close to the ground as practicable; that the weight of the rider is thrown more on the rear wheel than on the front, thereby greatly reducing the friction of the steering apparatus; that the pedals are arranged sufficiently to the rear of the front wheel as to allow a quick turn of the same without danger of the wheel and pedal colliding; that the general outlines of the horse are preserved in the construction of the machine; and lastly, that the horse or body portion is made of two sections, a feature that greatly simplifies the construction and manufacture. The sections of the horse are secured against separation by the rivets and also by the rear axle and driving axle, these parts serving to hold the sections from springing apart under the weight of the rider. The meeting edges of the sections come together in a close and practically invisible joint at all points, except where the two axles are arranged. At these points, the sections are cut out to allow for the provision of extended bearings for said axles.

Having thus fully described my invention, what I claim as new and desire to secure by Letters Patent, is:—

1. In a velocipede, the combination with a longitudinally divided hollow body, of a driven wheel mounted on the body and arranged between the sections thereof, a steering shaft arranged in the neck of the body and held between the two sections, and a driving means having connection with the driven wheel.

2. In a velocipede, the combination with a body made of two longitudinal sections of the shape of a horse, of axles or shafts mounted in bearings and uniting the sections of the body, sprocket wheels fastened to the axles outside of and spaced from the body, a steering wheel located below the neck of the body, a rearwardly inclined steering shaft arranged between and held by the two sections and connected to the steering wheel, a driven wheel fastened to the rear axle and working between the sections of the body, and a sprocket chain connecting the sprocket wheels.

3. In a velocipede, the hollow body longitudinally divided to form two sections which are secured together, a rear axle mounted in the body and connecting the sections thereof, a driving shaft also mounted in the body and forming a connection for the sections, a driven wheel mounted on the rear axle between the sections of the body, a chain and sprocket gearing connection between the driving shaft and the rear axle, a front steering wheel, and a steering shaft held between the two sections of the body at the front.

4. In a velocipede, the combination with a sectional hollow body, the sections of which are longitudinally disposed, a tube made in sections which are formed integral with the body sections and arranged at the neck of the body between the sections, of a steering wheel located below the tube, a fork for the wheel having an upstanding shaft connected therewith, said shaft extending through and beyond the upper end of the sectional tube, handles fastened to the upper end of the shaft, and a driving mechanism carried by the body sections, the axles of said mechanism serving as connections for the sections.

5. In a velocipede, a hollow body in the shape of a horse composed of two longitudinally divided sections, each constituting one half of the body, the meeting edges of the sections abutting together in a close joint, and the said body constituting the entire frame-work of the velocipede, in combination with a front steering wheel having its steering shaft journaled in the neck of the horse-shaped body, so that the head projects over the steering wheel, a rear driven axle mounted in the rear portion of the horse, a front driving axle or shaft mounted in the front portion of the horse, gearing connecting the two axles together, the said axles serving as connecting means for the sections of the body, and said sections being cut out at the places where the two axles are provided in order to provide extended bearings for the two axles and also to permit the rear driven wheel to work within the hollow body, the said wheel being mounted on the rear axle within the cutout portion of the body, substantially as described.

In testimony, that I claim the foregoing as my own, I have hereto affixed my signature in the presence of two witnesses.

ROBERT V. JONES.

Witnesses:
  EMMA A. WILLIAMS,
  SAMUEL ZECHER.